United States Patent

Huang et al.

Patent Number: 5,883,984
Date of Patent: Mar. 16, 1999

[54] METHOD AND APPARATUS FOR CONTRAST ENHANCEMENT OF COLOR IMAGES

[75] Inventors: Ching-Mei Huang, Miao-Li Hsien; Jo-Tan Yao, Taipei Hsien; Hung-Ju Huang, Taipei, all of Taiwan

[73] Assignee: Silicon Integrated Systems Corp., Taiwan

[21] Appl. No.: 724,892

[22] Filed: Oct. 3, 1996

[51] Int. Cl.⁶ ..................................................... G06K 9/36
[52] U.S. Cl. ........................................... 382/274; 382/239
[58] Field of Search .................................. 382/274, 239, 382/266; 358/433; 348/384

[56] References Cited

U.S. PATENT DOCUMENTS

| | | | |
|---|---|---|---|
| 5,016,173 | 5/1991 | Kenet et al. | 364/413.13 |
| 5,144,688 | 9/1992 | Bovir et al. | 382/56 |
| 5,282,255 | 1/1994 | Bovik et al. | 382/56 |
| 5,332,968 | 7/1994 | Brown | 324/309 |

*Primary Examiner*—Scott Rogers
*Assistant Examiner*—Stephen Brinich
*Attorney, Agent, or Firm*—Finnegan, Henderson, Farabow, Garrett, & Dunner, L.L.P.

[57] ABSTRACT

A method for contrast enhancement of pixel data of a decompressed color image includes the steps of computing I component values in an HSI color space for the pixel data of the color image, computing an image I component value which is an average of the computed I component values, and enhancing each of the pixel data of the color image according to the image I component value. An apparatus for contrast enhancement of pixel data of a decompressed color image is also disclosed.

11 Claims, 8 Drawing Sheets

METHOD AND APPARATUS FOR CONTRAST ENHANCEMENT OF COLOR IMAGES

BACKGROUND OF THE INVENTION

1. Field of the Invention

The invention relates to color image processing, more particularly to a method and apparatus for contrast enhancement of color images.

2. Description of the Related Art

A variety of image compression techniques are available in the art to reduce the required bandwidth during signal transmission and the required memory space for storing digital images. During compression or decompression, high frequency signals are sacrificed to attain compression efficiency and real-time decompression. However, the image that is obtained after decompression is often blurred and dull. Thus, there is a need to perform contrast enhancement to restore the clarity and brightness of the image.

For black-and-white images, the dynamic range of intensity or luminance can be increased to attain contrast enhancement. However, for color images, in addition to luminance, color saturation and hue should also be taken into account.

It is known that the same color information in one color space has corresponding component values in another color space. Thus, contrast enhancement can be achieved in different color spaces. For example, when contrast enhancement is done in the YCbCr color space, it has been found that, although the luminance of the image is increased, a less saturated image is obtained when the contrast enhancement factor is increased.

SUMMARY OF THE INVENTION

The main object of this invention is to provide a method and apparatus which employs the I component values in the HSI color space of pixel data of a color image to achieve contrast enhancement of the color image.

Another object of this invention is to provide a method and apparatus for performing contrast enhancement of a color image at a relatively low cost.

A further object of this invention is to provide a method and apparatus for performing contrast enhancement of motion video.

According to one aspect of this invention, a method for contrast enhancement of pixel data of a decompressed color image comprises: (a) computing I component values in an HSI color space for the pixel data of the color image; (b) computing an image I component value which is an average of the I component values obtained in step (a); and (c) enhancing each of the pixel data of the color image according to the image I component value.

The pixel data of the color image may be in the RGB or YCbCr color space. The image I component value may be a median value or a mean value of the I component values obtained in step (a). Sampling may be performed so that only the I component values of sampled ones of the pixel data are computed to result in a simpler construction and in a relatively low hardware cost. In addition, the image I component value used in step (c) may be a weighted average of the image I component values of a number of previous color images to permit contrast enhancement of motion video.

According to another aspect of this invention, an apparatus for contrast enhancement of pixel data of a decompressed color image comprises: a first computing circuit receiving the pixel data of the color image and computing I component values in an HSI color space for the pixel data of the color image; a second computing circuit receiving the I component values from the first computing circuit and computing an image I component value which is an average of the I component values from the first computing circuit; and an enhancing circuit receiving the pixel data of the color image and the image I component value from the second computing circuit, the enhancing circuit enhancing each of the pixel data of the color image according to the image I component value.

The second computing circuit may comprise a median computing circuit for computing a median value of the I component values from the first computing circuit, or a mean computing circuit for computing a mean value of the I component values from the first computing circuit. The apparatus may further comprise a sampling circuit for activating the first computing circuit to compute only the I component values of sampled ones of the pixel data. The second computing circuit may additionally comprise a weighted average circuit for providing a weighted average of the image I component values of a number of previous color images to the enhancing circuit to permit contrast enhancement of motion video.

BRIEF DESCRIPTION OF THE DRAWINGS

Other features and advantages of this invention will become apparent in the following detailed description of the preferred embodiments with reference to the accompanying drawings, of which.

DETAILED DESCRIPTION OF THE PREFERRED EMBODIMENTS

Figure 1:
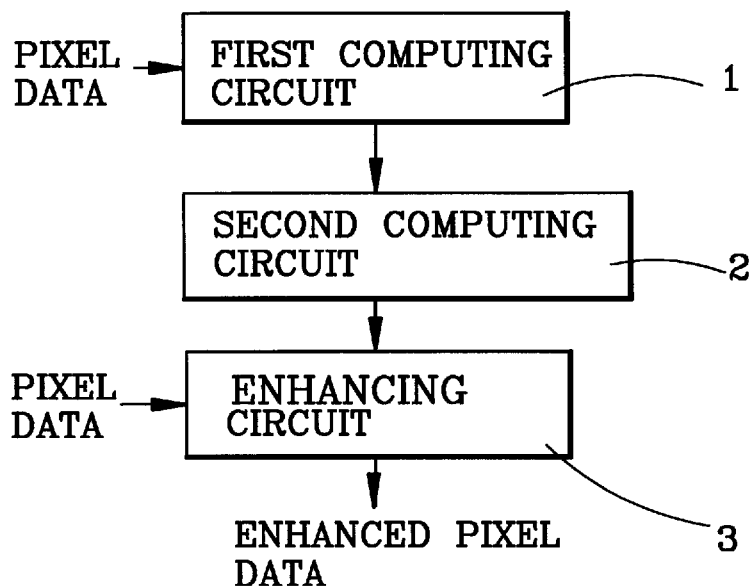
FIG. 1 is a schematic circuit block diagram of a contrast enhancement apparatus according to this invention.

Before this invention is described in greater detail, it should be noted that like elements are denoted by the same reference numerals throughout the disclosure.

Referring to FIG. 1, the contrast enhancement apparatus of this invention is shown to comprise a first computing circuit 1 for computing the I component values in the HSI color space of pixel data of a decompressed color image, a second computing circuit 2 for computing an image I component value which is an average of the I component values from the first computing circuit 1, and an enhancing circuit 3 for enhancing each of the pixel data of the color image according to the image I component value from the second computing circuit 2.

The pixel data of the color image may be in the RGB color space or in the YCbCr color space. The color space conversion from the RGB color space to the HSI color space is as follows:

$$H = \cos^{-1}\{\tfrac{1}{2}[(R-G)+(R-B)]/[(R-G)^2+(R-B)(G-B)]^{\tfrac{1}{2}}\} \quad (1)$$

$$S = 1 - [3/(R+G+B)][\min(R,G,B)] \quad (2)$$

$$I = (R+G+B)/3 \quad (3)$$

wherein H is the hue, S is the saturation, and I is the intensity.

Figure 2:
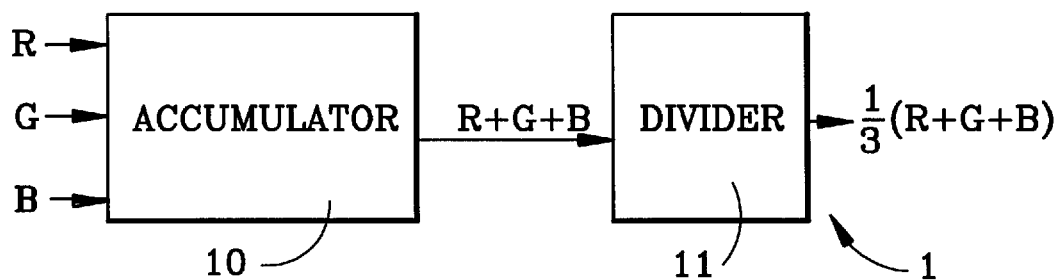
FIG. 2 is a schematic circuit block diagram of one embodiment of a first computing circuit of the contrast enhancement apparatus of this invention.

If the pixel data is in the RGB color space, the first computing circuit 1 is used to perform equation (3). Referring to FIG. 2, one embodiment of the first computing circuit 1 is shown to comprise an accumulator 10 for adding the RGB color components of input pixel data to obtain a sum, and a divider 11 which divides the sum from the accumulator 10 by three so as to obtain the I component value corresponding to the input pixel data.

Since the divide by three operation is a relatively complicated operation, the divider 11 may be replaced by a calculating circuit which performs iterative accumulation of fourth-order fractions, e.g. ¼, ¹⁄₁₆, ¹⁄₆₄, etc., of the sum from the accumulator 10 so as to approximate one-third of the sum of the RGB color components in order to obtain the I component value corresponding to the input pixel data.

Figure 3:
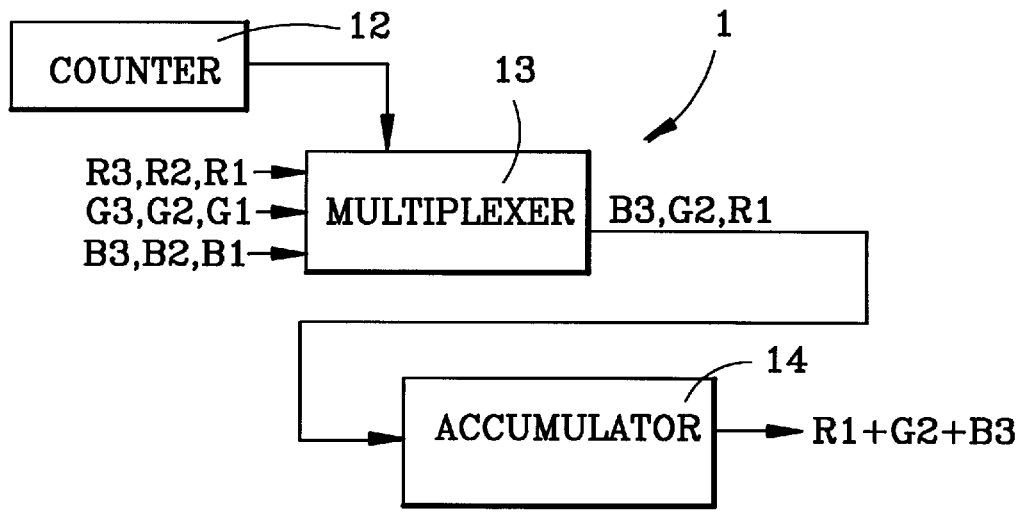
FIG. 3 is a schematic circuit block diagram of another embodiment of the first computing circuit of the contrast enhancement apparatus of this invention.

Referring to FIG. 3, another embodiment of the first computing circuit 1 is shown to comprise a multiplexer 13 with three data inputs which respectively receive the RGB color components of the input pixel data, and a modulo-3 counter 12 which successively generates "0," "1," and "2" count outputs that are provided to select inputs of the multiplexer 13. As such, the RGB color components of successive pixel data are alternately selected by the multiplexer 13 for accumulation by an accumulator 14. That is to say, the multiplexer 13 outputs the R component (R1) of a first one of the input pixel data when the counter 12 generates the "0" count output, the G component (G2) of a second one of the input pixel data when the counter 12 generates the "1" count output, and the B color component (B3) of a third one of the input pixel data when the counter 12 generates the "2" count output. The R1, G2 and B3 outputs of the multiplexer 13 are provided to the accumulator 14 which generates the sum of the same. In this embodiment, the sum of R1+G2+B3 can be used to approximate the equation [⅓(R1+G1+B1)+⅓(R2+G2+B2)+⅓(R3+G3+B3)], which is the sum of the I component values of the first, second and third ones of the input pixel data, since the difference between adjacent pixel data of a color image is minimal.

In the contrast enhancement apparatus of this invention, the image I component value that is computed by the second computing circuit 2 is an average of the I component values from the first computing circuit 1. The average may be a median value or a mean value of the I component values from the first computing circuit 1.

The median value is defined as the middle value in a set of measured values when the latter are arranged in order of magnitude. In his book entitled "Practical Digital Video with Programming Examples in C," published in 1994 by John Wiley & Sons, Inc., Philip E. Mattison disclosed that the correct contrast enhancement can be done by finding the median brightness level of the image to be enhanced. The dynamic range of a whole image can be achieved by $$\text{New\_Pixel\_Value} = (\text{Pixel\_Value} - \text{Median\_Value}) \times \text{Contrast\_Enhancement\_Gain} + \text{Median\_Value} \quad (4)$$

In this invention, equation (4) is modified as follows in accordance with the color space in which image enhancement is to be performed:

Median_I ← Median of I $$\text{Enhanced\_R} = (R - \text{Median\_I}) \times \text{Contrast\_Enhancement\_Gain} + \text{Median\_I} \quad (5)$$

$$\text{Enhanced\_G} = (G - \text{Median\_I}) \times \text{Contrast\_Enhancement\_Gain} + \text{Median\_I} \quad (6)$$

$$\text{Enhanced\_B} = (B - \text{Median\_I}) \times \text{Contrast\_Enhancement\_Gain} + \text{Median\_I} \quad (7)$$

Figure 4:
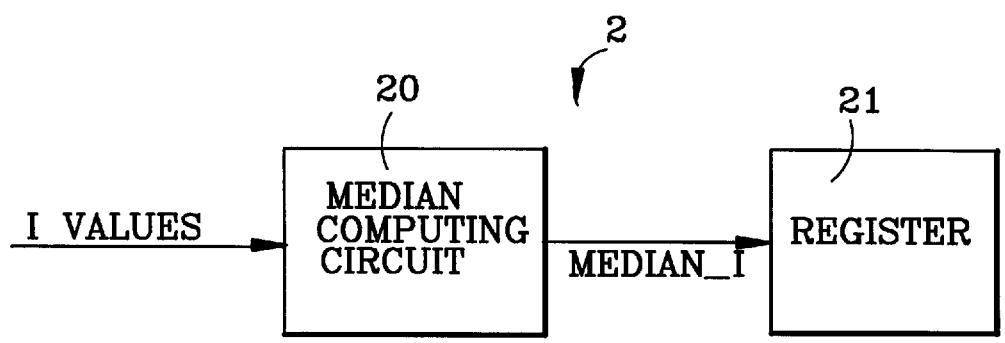
FIG. 4 is a schematic circuit block diagram of one embodiment of a second computing circuit of the contrast enhancement apparatus of this invention.

Referring to FIG. 4, to compute the median I component value of the pixel data of a whole color image, the second computing circuit 2 is shown to include a median computing circuit 20 which receives the I component values from the first computing circuit 1, and a register 21. The median computing circuit 20 arranges the I component values in order of magnitude and determines a median_I component value wherein half of the I component values are less than the median_I component value while the other half of the I component values are greater than the median_I component value. The register 21 is used to store the median_I component value therein.

Figures 5, 6:
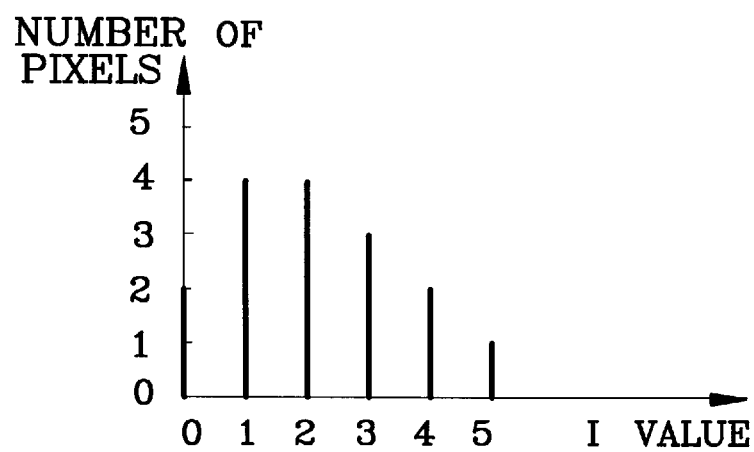
FIG. 5 illustrates a 4×4 array which shows the I component values of pixel data of a sample color image.
FIG. 6 is a distribution graph of the I component values shown in FIG. 5.
Figure 7:
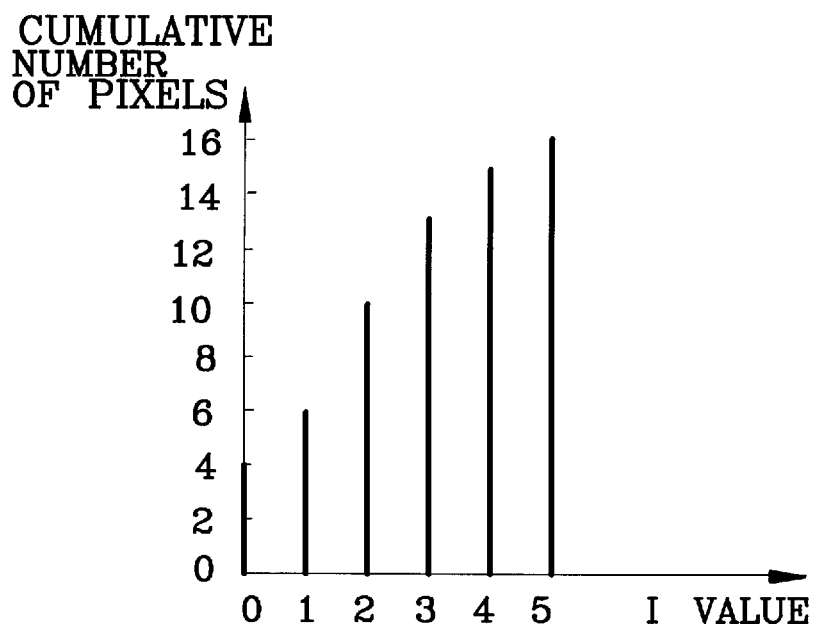
FIG. 7 is a cumulative distribution graph of the I component values shown in FIG. 5.

FIG. 5 illustrates a 4×4 array which shows the I component values computed by the first computing circuit 1 from pixel data of a sample color image. FIG. 6 is a distribution graph of the I component values shown in FIG. 5, while FIG. 7 is a cumulative distribution graph of the I component values shown in FIG. 5. From FIGS. 5 to 7, it can be seen that more than half of the sixteen I component values in the array have a value that is less than or equal to 2. Thus, the median_I component value for the array shown in FIG. 5 is equal to 2.

Equations (5), (6) and (7) are modified as follows when the image I component value that is computed by the second computing circuit 2 is a mean value of the I component values from the first computing circuit 1:

Mean_I ← Mean of I $$\text{Enhanced\_R} = (R - \text{Mean\_I}) \times \text{Contrast\_Enhancement\_Gain} + \text{Mean\_I} \quad (8)$$

$$\text{Enhanced\_G} = (G - \text{Mean\_I}) \times \text{Contrast\_Enhancement\_Gain} + \text{Mean\_I} \quad (9)$$

$$\text{Enhanced\_B} = (B - \text{Mean\_I}) \times \text{Contrast\_Enhancement\_Gain} + \text{Mean\_I} \quad (10)$$

Figure 8:
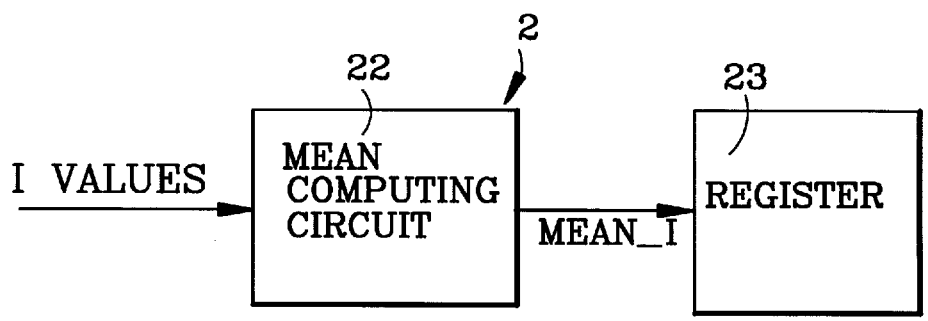
FIG. 8 is a schematic circuit block diagram of another embodiment of the second computing circuit of the contrast enhancement apparatus of this invention.

Referring to FIG. 8, to compute the mean I component value of the pixel data of a whole color image, the second computing circuit 2 is shown to include a mean computing circuit 22 which receives the I component values from the first computing circuit 1, and a register 23. The mean computing circuit 22 accumulates the I component values and divides the resulting sum by the number of I component values received thereby so as to obtain the mean_I component value. The register 23 is used to store the mean_I component value therein.

It should be noted that the mean computing circuit 22 does not require the use of a divider when the total number of I component values received thereby is a power of two since division can be achieved by simply disregarding some of the least significant bits of the resulting sum, thereby resulting in a lower hardware cost.

For the array shown in FIG. 5, the computed mean_I component value is 2.12, which has a slight difference as compared to the computed median_I value of 2 described beforehand.

Note that a higher hardware cost is incurred when the image I component value that is computed by the second computing circuit 2 is the median_I value. In order for the second computing circuit 2 to arrange the I component values in order of magnitude, a register unit with a relatively large capacity must be provided so as to store the I component values therein. For example, in a 352×240 color image, the register unit must be capable of storing up to 84,480 I component values.

Although it may seem that a lower hardware cost would be incurred when the image I component value that is computed by the second computing circuit 2 is the mean_I value, hardware implementation of the same would be more difficult when the total number of I component values is not a power of two. In the 352×240 color image example, the accumulator of the mean computing circuit 22 must be capable of processing up to 25 bits of data, while the divider of the same must be capable of providing up to 17 bits of data, thereby resulting in a relatively high hardware cost. In order to reduce the hardware cost that would be incurred, the contrast enhancement apparatus of this invention further comprises a sampling circuit so that the I component values of only sampled ones of the pixel data of the color image will be computed by the first computing circuit 1. Preferably, the number of samples is a power of two to obviate the need for a divider when the second computing circuit 2 computes the mean_I component value. The sampling points are determined via a sampling factor (CTRFACT) which depends upon the image size (Image_Size), the sample number (Sample_No) and a maximum count (Max_Range), wherein:

$$\text{Image\_Size}/[\text{Image\_Size}-\text{Sample\_No}]=\text{Max\_Range}/[\text{Max\_Range}-\text{CTRFACT}] \quad (11)$$

Equation (11) can be manipulated so as to obtain the following:

$$\text{CTRFACT}=\text{ceil}[\text{Sample\_No}\times\text{Max\_Range}/\text{Image\_Size}] \quad (12)$$

The image size (Image_Size) corresponds to the number of pixel data in the color image. The sample number (Sample_No) is the desired number of pixel data whose I component values are to be computed. The ratio of the sample number (Sample_No) to the image size (Image_Size) is the sampling ratio. In the computation of the sampling factor (CTRFACT), the mathematical operation "ceil" is performed in which only the integer portion of the result of the bracketed operation is considered. The maximum count (Max_Range) is selected so that the sampling factor (CTRFACT) is a non-zero number which meets the hardware design requirements and so that a precise sampling ratio can be attained. A reasonable sampling ratio would range from 2% to 20%.

Figure 9:
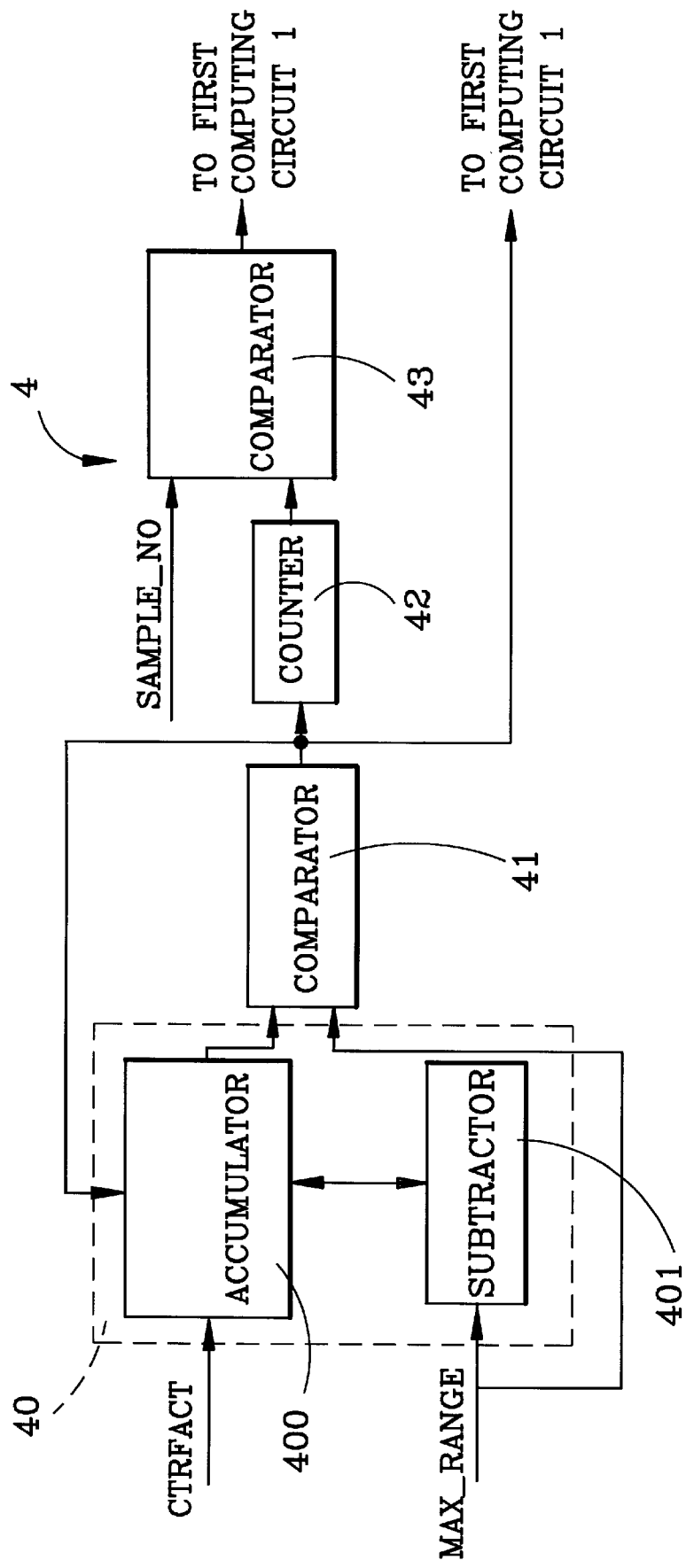
FIG. 9 is a schematic circuit block diagram of a sampling circuit of the contrast enhancement apparatus of this invention.

Referring to FIG. 9, the preferred embodiment of a sampling circuit 4 of the contrast enhancement apparatus of this invention is used to select appropriate ones of the pixel data of the color image to be operated upon by the first computing circuit 1 and is shown to comprise a third computing circuit 40, a first comparator 41, a counter 42 and a second comparator 43.

The third computing circuit 40 includes an accumulator 400 which has the sampling factor (CTRFACT) as its input and which has an output that is incremented by the sampling factor (CTRFACT) every time one of the pixel data of the color image is provided to the first computing circuit 1. The third computing circuit 40 further includes a subtractor 401 which is connected to the accumulator 400 and which has the maximum count (Max_Range) as one of its inputs. The first comparator 41 receives the output of the accumulator 400 and compares the same with the maximum count (Max_Range). When the output of the accumulator 400 exceeds the maximum count (Max_Range), the first comparator 41 generates an enable signal for activating the first computing circuit 1 to compute the I component value of the pixel data that is provided thereto at that time. The enable signal is also received by the third computing circuit 40 such that the subtractor 401 deducts the maximum count (Max_Range) from the contents of the accumulator 400, and such that the resulting difference replaces the previous contents of the accumulator 400.

The counter 42 is triggered by the enable signal from the first comparator 41 and generates a count output which is indicative of the current number of the pixel data sampled from the color image.

The second comparator 43 receives the count output of the counter 42 and compares the same with the predetermined sample number (Sample_No). When the count output of the counter 42 becomes equal to the sample number (Sample_No), the second comparator 43 generates a disable signal for disabling the first computing circuit 1. The output of the second computing circuit 2 at this time is the image I component value for the whole color image.

Figure 10:
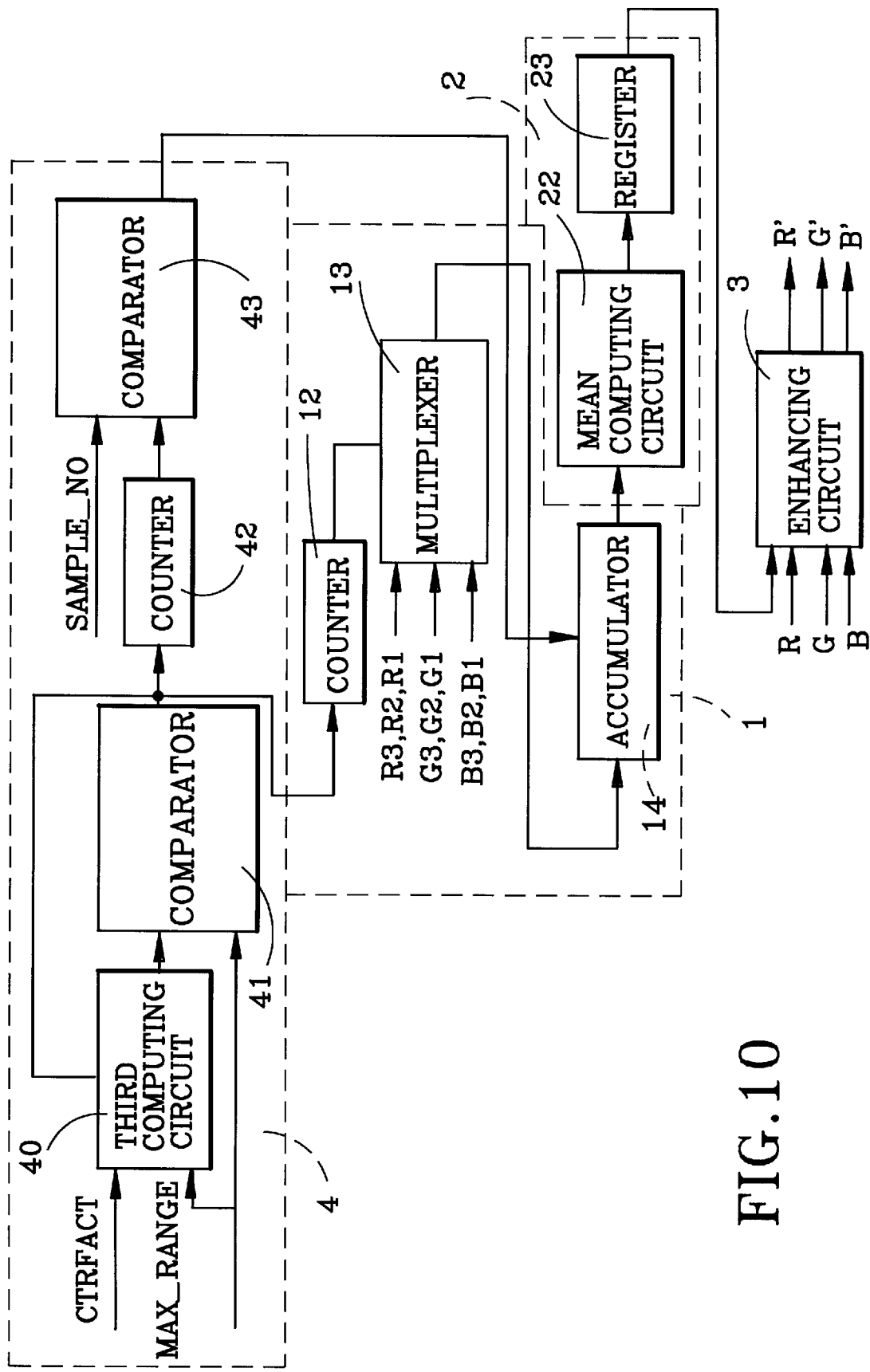
FIG. 10 is a schematic circuit block diagram which illustrates one embodiment of the contrast enhancement apparatus of this invention in greater detail.

Referring to FIG. 10, the sampling circuit 4 of FIG. 9, the first computing circuit 1 of FIG. 3, the second computing circuit 2 of FIG. 8, and the enhancing circuit 3 are combined to obtain a preferred embodiment of the contrast enhancement apparatus of this invention. Every time the output of the accumulator 400 exceeds the maximum count (Max_Range), the first comparator 41 generates the enable signal for activating the counter 12 of the first computing circuit 1. The counter 12 generates one of the "0," "1," and "2" count outputs so that the RGB color component values of successive pixel data are alternately selected by the multiplexer 13 for accumulation by the accumulator 14 of the first computing circuit 1 so as to generate the I component values of the sampled pixel data. The I component values are received by the second computing circuit 2. When the count output of the counter 42 becomes equal to the sample number (Sample_No), the second comparator 43 generates the disable signal which is received by the accumulator 14. At this time, the mean computing circuit 22 of the second computing circuit 2 outputs the mean_I component value for the color image which is then stored in the register 23. As mentioned beforehand, the sample number (Sample_No) is preferably a power of two to obviate the need for a divider when the mean computing circuit 22 generates the mean_I component value, thereby resulting in a lower hardware cost. The enhancing circuit 3 receives the pixel data of the color image and the mean_I component value, and performs contrast enhancement of the pixel data in accordance with equations (8), (9) and (10). The contrast-enhanced pixel data are then provided to a display device (not shown).

Figure 11:
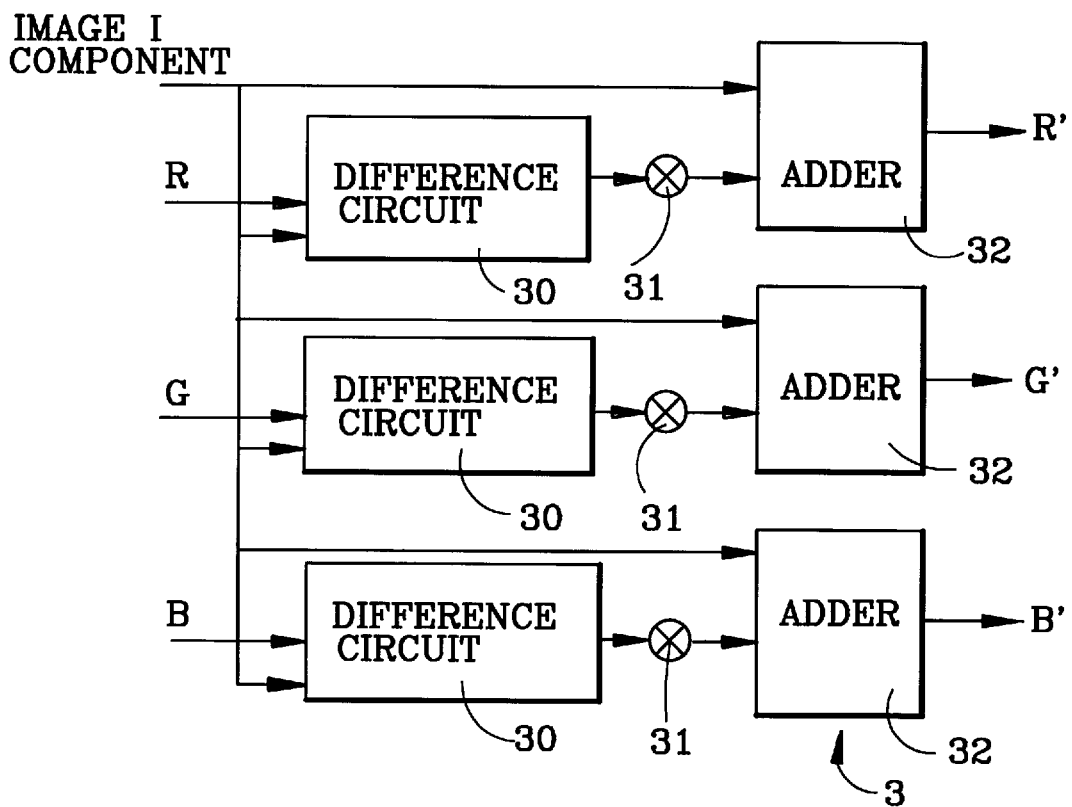
FIG. 11 is a schematic circuit block diagram of an enhancing circuit of the contrast enhancement apparatus of this invention.

Referring to FIG. 11, the enhancing circuit 3 includes three difference circuits 30, three gain circuits 31 and three adders 32. Each of the difference circuits 30 receives the image I component value from the second computing circuit 2 and one of the RGB color components of the pixel data. The difference circuits 30 subtract the image I component value from the respective one of the RGB color components, provides the resulting difference to a respective one of the gain circuits 31. Each gain circuit 31 scales the input thereof by a predetermined contrast enhancement factor. The output of each gain circuit 31 serves as one of the inputs of a respective one of the adders 32. The other input of each of the adders 32 is the image I component value. The adders 32 add the image I component value to the output of the respective one of the gain circuits 31 so as to obtain the R', G' and B' components of the contrast-enhanced pixel data.

Figure 12:
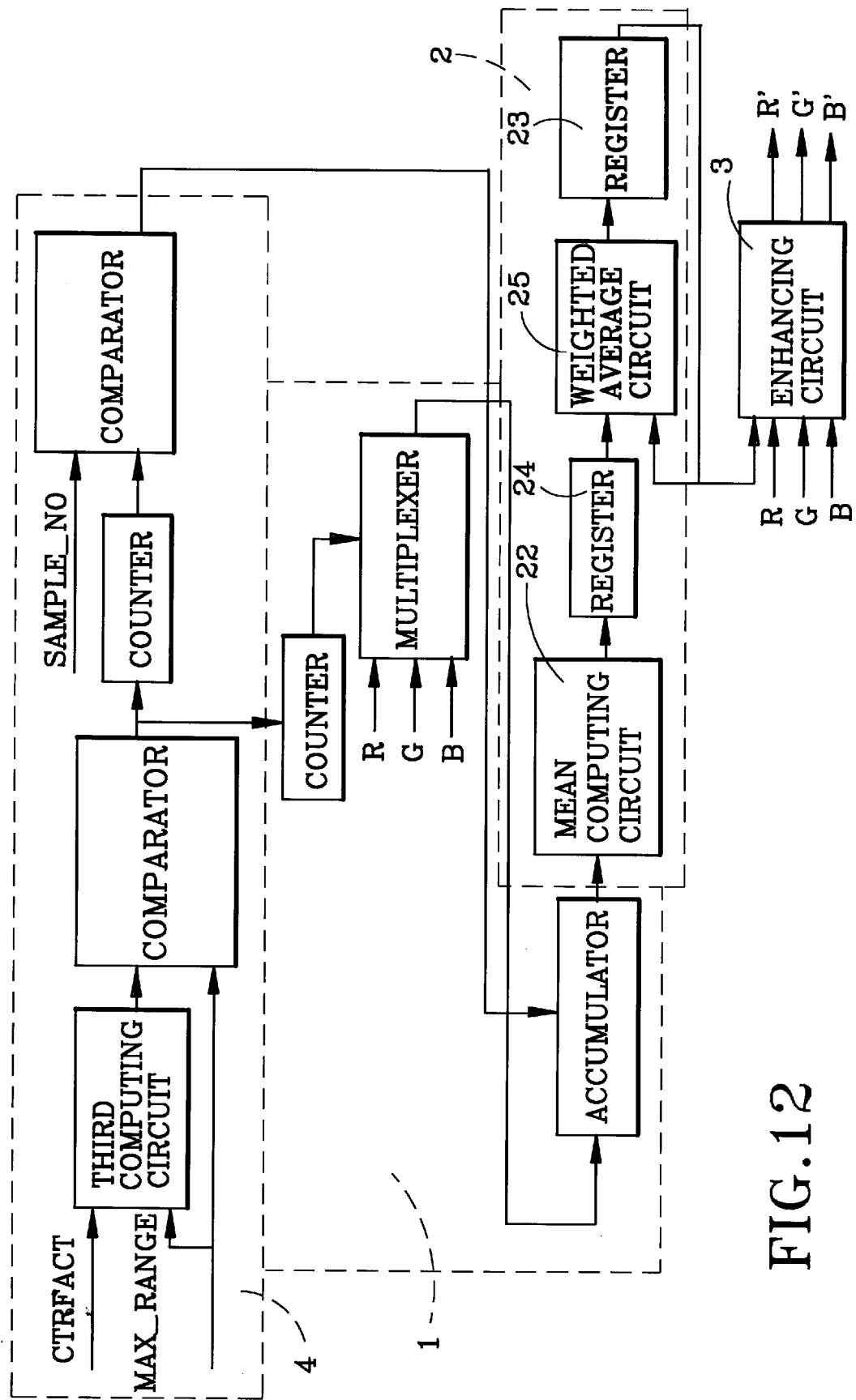
FIG. 12 is a schematic circuit block diagram which illustrates another embodiment of the contrast enhancement apparatus of this invention in greater detail.

The aforementioned contrast enhancement method is suitable for use in static video applications. When the contrast enhancement method is applied to motion video, a main difficulty that is encountered resides in that the image I component value cannot be determined until all of the pixel data of the color image have been supplied to the contrast enhancement apparatus. Thus, contrast enhancement of a current image cannot be done based on the image I component value of the current image unless the pixel data of the current image are stored in a memory device and are once again supplied to the contrast enhancement apparatus, thereby resulting in additional hardware cost and in an average delay of one frame. FIG. 12 illustrates a modified embodiment of the contrast enhancement apparatus which is suited for motion video applications. The main difference between the apparatus of this embodiment and that shown in FIG. 10 resides in the configuration of the second computing circuit 2. As shown, the second computing circuit 2 additionally includes a second register 24 and a weighted average circuit 25. The second register 24 receives the image I component values of a number of previous images from the mean computing circuit 22 and stores the same therein. The weighted average circuit 25 generates a weighted average of the image I component values in the second register 24 and provides the same to the first register 23. The weighted average is used as the image I component value for enhancing the pixel data of a current image, and may be derived from the image I component values of previous 2, 4, 8 or 16 of the color images.

By using the method and apparatus of this invention, the clarity and brightness of a decompressed color image can be restored. Since sampling of the pixel data may be performed when computing the image I component value, a lower hardware cost can be achieved. Although this invention was described with the pixel data in terms of RGB color components, the invention can also be applied when the pixel data are in another color space, such as the YCbCr color space, through mere use of known color space conversion tables.

While this invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for contrast enhancement of pixel data of a decompressed color image, comprising:

(a) computing I component values in an HSI color space for the pixel data of the color image, the pixel data of the color image being in the RGB color space;

(b) computing an image I component value which is an average of the I component values obtained in step (a); and (c) enhancing each of the pixel data of the color image according to the image I component value;

wherein the step (a) comprises adding RGB color components of the pixel data to obtain a sum, and performing iterative accumulation of fourth-order fractions of the sum to approximate one-third of the sum and obtain the I component value corresponding to the pixel data.

2. A method for contrast enhancement of pixel data of a decompressed color image, comprising:

(a) computing I component values in an HSI color space for the pixel data of the color image, the pixel data of the color image being in the RGB color space;

(b) computing an image I component value which is an average of the I component values obtained in step (a); and (c) enhancing each of the pixel data of the color image according to the image I component value;

wherein the step (a) comprises adding an R color component of a first one of the pixel data, a G color component of a second one of the pixel data, and a B color component of a third one of the pixel data to obtain a sum which is used to approximate a sum of the I component values of the first, second and third ones of the pixel data.

3. A method for contrast enhancement of pixel data of a decompressed color image, comprising:

(a) computing I component values in an HSI color space for the pixel data of the color image;

(b) computing an image I component value which is an average of the I component values obtained in step (a); and (c) enhancing each of the pixel data of the color image according to the image I component value;

wherein the image I component value is a median value of the I component values obtained in step (a); and wherein the step (b) comprises arranging the I component values obtained in step (a) in order of magnitude, and assigning a median I component value, in which half of the I component values are less than the median I component value while the other half of the I component values are greater than the median I component value, as the image I component value.

4. A method for contrast enhancement of pixel data of a decompressed color image, comprising:

(a) computing I component values in an HSI color space for the pixel data of the color image;

(b) computing an image I component value which is an average of the I component values obtained in step (a); and (c) enhancing each of the pixel data of the color image according to the image I component value;

wherein the step (c) comprises obtaining difference of the pixel data and the image I component value, scaling the difference by a predetermined contrast enhancement factor, and adding the image I component value to the scaled difference to obtain contrast-enhanced pixel data.

5. An apparatus for contrast enhancement of pixel data of a decompressed color image, comprising:

a first computing circuit receiving the pixel data of the color image and computing I component values in an HSI color space for the pixel data of the color image, the pixel data of the color image being in the RGB color space;

a second computing circuit receiving the I component values from the first computing circuit and computing an image I component value which is an average of the I component values from the first computing circuit; and an enhancing circuit receiving the pixel data of the color image and the image I component value from the second computing circuit, the enhancing circuit enhancing each of the pixel data of the color image according to the image I component value;

wherein the first computing circuit comprises an accumulator for adding RGB color components of the pixel data to obtain a sum, and a calculating circuit for performing iterative accumulation of fourth-order fractions of the sum to approximate one-third of the sum and obtain the I component value corresponding to the pixel data.

6. An apparatus for contrast enhancement of pixel data of a decompressed color image, comprising:

a first computing circuit receiving the pixel data of the color image and computing I component values in an HSI color space for the pixel data of the color image, the pixel data of the color image being in the RGB color space;

a second computing circuit receiving the I component values from the first computing circuit and computing an image I component value which is an average of the I component values from the first computing circuit; and an enhancing circuit receiving the pixel data of the color image and the image I component value from the second computing circuit, the enhancing circuit enhancing each of the pixel data of the color image according to the image I component value;

wherein the first computing circuit comprises:

a multiplexer having select inputs and data inputs that receive RGB color components of the pixel data respectively;

a modulo-3 counter for successively generating "0," "1," and "2" count outputs that are provided to the select inputs of the multiplexer so as to control the multiplexer to output the R color component of a first one of the pixel data, the G color component of a second one of the pixel data, and the B color component of a third one of the pixel data; and an accumulator for adding outputs of the multiplexer to obtain a sum which is used to approximate a sum of the I component values of the first, second and third ones of the pixel data.

7. An apparatus for contrast enhancement of pixel data of a decompressed color image, comprising:

a first computing circuit receiving the pixel data of the color image and computing I component values in an HSI color space for the pixel data of the color image;

a second computing circuit receiving the I component values from the first computing circuit and computing an image I component value which is an average of the I component values from the first computing circuit; and an enhancing circuit receiving the pixel data of the color image and the image I component value from the second computing circuit, the enhancing circuit enhancing each of the pixel data of the color image according to the image I component value:

wherein the image I component value computed by the second computing circuit is a median value of the I component values from the first computing circuit; and wherein the second computing circuit comprises a median computing circuit for arranging the I component values obtained from the first computing circuit in order of magnitude and for assigning a median I component value in which half of the I component values are less than the median I component value while the other half of the I component values are greater than the median I component value, as the image I component value.

8. An apparatus for contrast enhancement of pixel data of a decompressed color image, comprising:

a first computing circuit receiving the pixel data of the color image and computing I component values in an HSI color space for the pixel data of the color image;

a second computing circuit receiving the I component values from the first computing circuit and computing an image I component value which is an average of the I component values from the first computing circuit;

an enhancing circuit receiving the pixel data of the color image and the image I component value from the second computing circuit, the enhancing circuit enhancing each of the pixel data of the color image according to the image I component value; and a sampling circuit for activating the first computing circuit to compute only the I component values of sampled ones of the pixel data;

wherein the sampling circuit comprises:

a third computing circuit having an output that is incremented by a predetermined sampling factor every time one of the pixel data of the color image is provided to the first computing circuit;

a first comparator receiving the output of the third computing circuit and comparing the output of the third computing circuit with a predetermined maximum count, the first comparator generating an enable signal for activating the first computing circuit to compute the I component value of the pixel data that is provided thereto at that time when the output of the third computing circuit exceeds the maximum count, the enable signal being further received by the third computing circuit to control the third computing circuit to reduce the output thereof by the maximum count;

a counter triggered by the enable signal from the first comparator, the counter generating a count output indicative of current number of the pixel data sample from the color image; and a second comparator receiving the count output of the counter and comparing the count output with a predetermined sample number, the second comparator disabling the first computing circuit when the count output is equal to the sample number.

9. The apparatus as claimed in claim 8, wherein the sample number is a power of 2.

10. An apparatus for contrast enhancement of pixel data of a decompressed color image, comprising:

a first computing circuit receiving the pixel data of the color image and computing I component values in an HSI color space for the pixel data of the color image, the pixel data of the color image being in the RGB color space;

a second computing circuit receiving the I component values from the first computing circuit and computing an image I component value which is an average of the I component values from the first computing circuit; and an enhancing circuit receiving the pixel data of the color image and the image I component value from the second computing circuit, the enhancing circuit enhancing each of the pixel data of the color image according to the image I component value;

wherein the enhancing circuit comprises:

three difference circuits, each of which generates difference between a respective one of RGB color components of the pixel data and the image I component value;

three gain circuits, each of which scaling the difference from a respective one of the difference circuits by a predetermined contrast enhancement factor; and three adders for adding the image I component value to the scaled difference from a respective one of the gain circuits to obtain contrast-enhanced pixel data.

11. A method for contrast enhancement of pixel data of a decompressed color images, comprising:

(a) computing I component values in an HSI color space for the pixel data of the color images;

(b) computing an image I component value which is an average of the I component values obtained in step (a); and (c) computing a weighted image I component value for a current one of the color images by taking a weighted average of the image I component values of a number of previous ones of the color images; and (d) enhancing each of the pixel data of the color images according to the image I component value.

* * * * *